(12) United States Patent
Tseng

(10) Patent No.: US 8,971,005 B2
(45) Date of Patent: Mar. 3, 2015

(54) OVER TEMPERATURE PROTECTION CIRCUIT

(71) Applicant: Himax Technologies Limited, Tainan (TW)

(72) Inventor: Wei-Kai Tseng, Tainan (TW)

(73) Assignee: Himax Technologies Limited, Tainan (TW)

( * ) Notice: Subject to any disclaimer, the term of this patent is extended or adjusted under 35 U.S.C. 154(b) by 135 days.

(21) Appl. No.: 13/743,938

(22) Filed: Jan. 17, 2013

(65) Prior Publication Data

US 2014/0198421 A1 Jul. 17, 2014

(51) Int. Cl.
*H02H 5/04* (2006.01)

(52) U.S. Cl.
CPC ........................................ *H02H 5/04* (2013.01)
USPC ............................................ 361/103; 361/93.8

(58) Field of Classification Search
USPC ................................. 361/93.7–93.9, 103, 106
See application file for complete search history.

(56) References Cited

U.S. PATENT DOCUMENTS

| 4,669,026 A | * | 5/1987 | Widlar | 361/103 |
| 7,352,522 B2 | * | 4/2008 | Vullers et al. | 360/69 |
| 8,451,571 B2 | | 5/2013 | Imura et al. | |
| 2004/0047099 A1 | * | 3/2004 | Pippin | 361/103 |

FOREIGN PATENT DOCUMENTS

| CN | 101165984 A | 4/2013 |
| TW | 201112558 A | 4/2011 |

OTHER PUBLICATIONS

English translation of abstract of CN 101165984 (published Apr. 23, 2008).
English translation of abstract of TW 201112558 (published Apr. 1, 2011).

* cited by examiner

*Primary Examiner* — Danny Nguyen
(74) *Attorney, Agent, or Firm* — McClure, Qualey & Rodack, LLP

(57) ABSTRACT

The present invention provides an over temperature protection circuit. The over temperature protection circuit includes a reference circuit and a hysteretic comparator. The reference circuit is used for generating a reference voltage and a changeable voltage. The changeable voltage is varied by temperature. The hysteretic comparator compares the reference voltage with the changeable voltage to output a power down signal.

11 Claims, 4 Drawing Sheets

OVER TEMPERATURE PROTECTION CIRCUIT

TECHNICAL FIELD

The present disclosure relates to an over temperature protection circuit, and more particularly to an over temperature protection circuit with a hysteretic comparator.

BACKGROUND

An experienced circuit designer generally recognizes that the task of designing an efficient power supply circuit requires that the issues of current measurement and current control be considered. One of the most important reasons for applying an over temperature protection circuit to a power supply circuit is that a current limit or over-load protection can be provided for the power supply circuit.

In a conventional circuit, the over temperature protection circuit comprises an overload measuring member and a temperature measuring member. In this solution, it is disadvantageous that comparatively many components are required since an overload and an over temperature are identified by different measuring members, that is, by the overload and the temperature measuring members. Such an over temperature protection circuit occupies a large volume.

SUMMARY

The present invention discloses an over temperature protection circuit. The over temperature protection circuit includes a reference circuit and a hysteretic comparator. The reference circuit is used for generating a reference voltage and a changeable voltage. The changeable voltage is varied by temperature. The hysteretic comparator compares the reference voltage with the changeable voltage to output a power down signal.

In an embodiment, the hysteretic comparator further includes a bias current unit, a switching unit, a current sink unit and a signal output unit. The bias current unit is used for generating a constant current. The switching unit is connected to the bias current unit. The switching unit includes a first current path and a second current path for receiving the reference voltage and the changeable voltage to arrange the constant current in the first current path and the second current path. The current sink unit is connected to the switching unit. The current sink unit sinks the current into the first current path and the second current path. The signal output unit is connected to the current sink unit to output the power down signal.

In an embodiment, the switching unit further includes a first transistor and a second transistor. The first transistor receives the changeable voltage to control the current flowing in the first current path. The second transistor receives the reference voltage to control the current flowing in the second current path.

In an embodiment, the current sink unit further includes a third transistor, a fourth transistor, a fifth transistor and a sixth transistor. The third transistor and the fourth transistor are connected in a current mirror relationship. The third transistor is connected to the first current path, and the fourth transistor is connected to the second current path. The fifth transistor and the sixth transistor are connected in a current mirror relationship. The fifth transistor is connected to the first current path, and the sixth transistor is connected to the second current path. The width/length ratio of the fourth transistor is greater than the width/length ratio of the third transistor, and the width/length ratio of the sixth transistor is greater than the width/length ratio of the fifth transistor.

In an embodiment, the signal output unit further includes a seventh transistor, an eighth transistor, a ninth transistor and a tenth transistor. The eighth transistor is connected to the seventh transistor in a current mirror relationship. A drain of the ninth transistor is connected to the seventh transistor, and a gate of the ninth transistor is connected to the second current path. A drain of the tenth transistor is connected to the eighth transistor, and a gate of the tenth transistor is connected to the first current path.

In an embodiment, the current sink unit further includes a third transistor, a fourth transistor, a fifth transistor and a sixth transistor. A gate of the third transistor is connected to a drain of the third transistor and the first current path. A gate of the fourth transistor is connected to a drain of the fourth transistor and the second current path. A gate of the fifth transistor is connected to a gate of the fourth transistor and the signal output unit. The sixth transistor is connected between the gate of the fourth transistor and a drain of the fifth transistor, and a gate of the sixth transistor is connected to the signal output unit.

In an embodiment, the signal output unit further includes a seventh transistor, an eighth transistor, a ninth transistor and a tenth transistor. The eighth transistor is connected to the seventh transistor in a current mirror relationship. A drain of the ninth transistor is connected to the seventh transistor and a gate of the sixth transistor, and a gate of the ninth transistor is connected to the gate of the fifth transistor and the gate of the fourth transistor. A drain of the tenth transistor is connected to the eighth transistor, and a gate of the tenth transistor is connected to the gate of the third transistor.

In an embodiment, the reference circuit is a bandgap voltage reference circuit. The reference circuit includes an operational amplifier, a first transistor, a second transistor, a third transistor, a resistor, a divider, a first diode, a second diode, and a third diode. A gate of the first transistor is coupled to an output end of the first operational amplifier, and a source of the first transistor is coupled to a power supply, and a drain of the first transistor is coupled to a positive input end of the first operational amplifier. A gate of the second transistor is coupled to the output end of the first operational amplifier, and a source of the second transistor is coupled to the power supply, and a drain of the second transistor is coupled to a negative input end of the first operational amplifier. A gate of the third transistor is coupled to the output end of the first operational amplifier, and a source of the third transistor is coupled to the power supply. A first end of the first resistor is coupled to the positive input end of the first operational amplifier. A first end of the divider is coupled to a drain of the third transistor to generate the reference voltage. A first end of the first diode is coupled to a second end of the resistor, and a second end of the first diode is coupled to a ground. A first end of the second diode is coupled to the negative input end of the operational amplifier to generate the changeable voltage, and a second end of the second diode is coupled to the ground. A first end of the third diode is coupled to the drain of the third transistor, and a second end of the second diode is coupled to the ground. The first transistor, the second transistor, and the third transistor are P-type MOS transistors. The first diode, the second diode and the third diode are formed with a PNP bipolar junction transistor (BJT) respectively, and a collector of the BJT is coupled to a base of the BJT.

BRIEF DESCRIPTION OF THE DRAWINGS

In order to make the foregoing as well as other aspects, features, advantages, and embodiments of the present disclosure more apparent, the accompanying drawings are described as follows.

DETAILED DESCRIPTION

Figure 1:
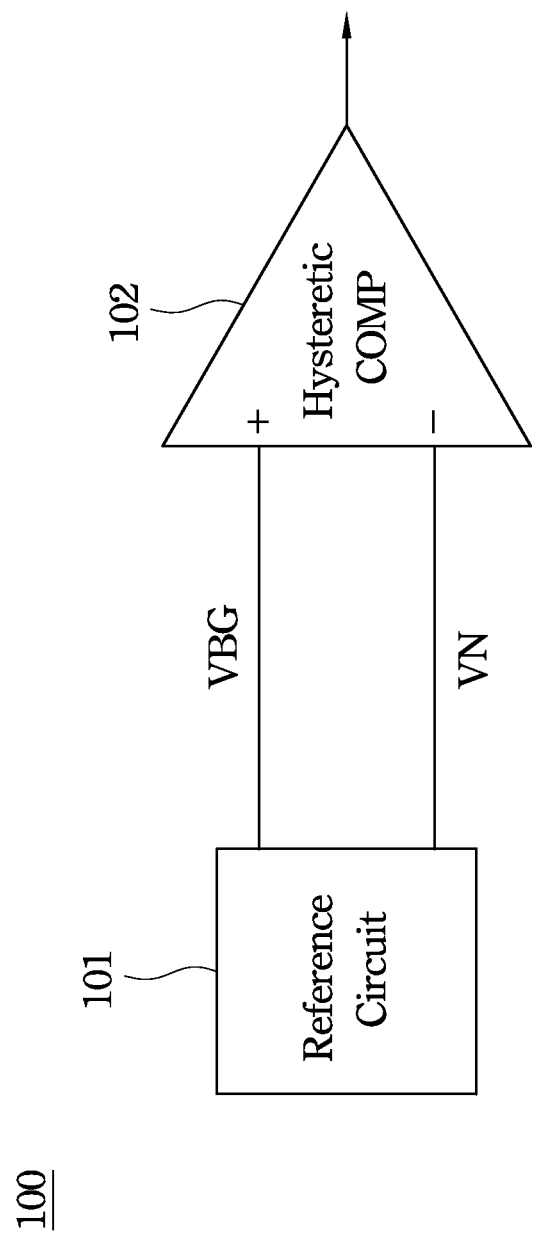
FIG. 1 is a schematic diagram of an over temperature protection circuit according to the present invention.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic diagram of an over temperature protection circuit 100 according to the present invention. The over temperature protection circuit 100 includes a reference circuit 101 and a hysteretic comparator 102. The reference circuit 101 is used to generate a reference voltage VBG and a changeable voltage VN. The changeable voltage VN is varied with temperature. The reference voltage VBG and the changeable voltage VN are transferred to the hysteretic comparator 102. The hysteretic comparator 102 compares the reference voltage VBG with the changeable voltage VN to output a power down signal to limit a current output of a power supply circuit, thereby preventing over temperature events.

Figure 2:
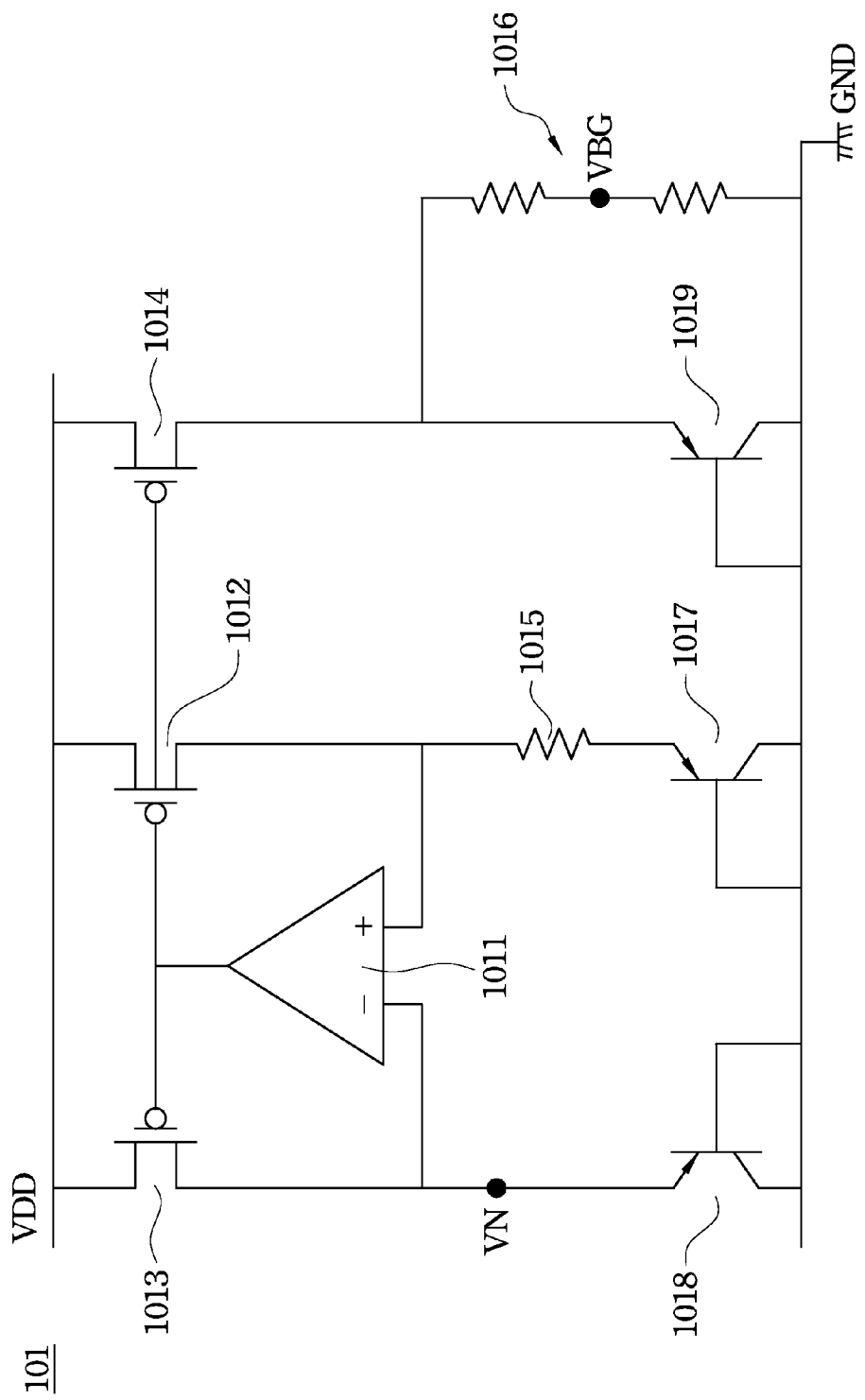
FIG. 2 is a schematic diagram of a reference circuit according to the present invention.

In an embodiment, the reference circuit 101 is a bandgap voltage reference circuit. FIG. 2 is a schematic diagram of the reference circuit 101 according to the present invention. The reference circuit 101 comprises a first operational amplifier 1011, a first transistor 1012, a second transistor 1013, a third transistor 1014, a resistor 1015, a divider 1016, a first diode 1017, a second diode 1018 and a third diode 1019.

A gate of the first transistor 1012 is coupled to an output end of the operational amplifier 1011. A source of the first transistor 1012 is coupled to a power supply VDD. A drain of the first transistor 1012 is coupled to a positive input end of the operational amplifier 1011. A gate of the second transistor 1013 is coupled to an output end of the operational amplifier 1011. A source of the second transistor 1013 is coupled to the power supply VDD. A drain of the second transistor 1013 is coupled to a negative input end of the operational amplifier 1011. A gate of the third transistor 1014 is coupled to the output end of the operational amplifier 1011. A source of the third transistor 1014 is coupled to the power supply VDD. A drain of the third transistor 1014 is coupled to the divider 1016 to generate a reference voltage VBG. power supply VDD. A first end of the resistor 1015 is coupled to the positive input end of the operational amplifier 1011. A second end of the resistor 1015 is coupled to a first end of the first diode 1017. A second end of the first diode 1017 is coupled to a ground GND. A first end of the second diode 1018 is coupled to the negative input end of the operational amplifier 1011 to generate the changeable voltage VN. A second end of the second diode 1018 is coupled to the ground GND. A first end of the third diode 1019 is coupled to the drain of the third transistor 1014. A second end of the third diode 1019 is coupled to the ground GND. The first transistor 1012, the second transistor 1013, and the third transistor 1014 are P-type MOS transistors. The first diode 1017, the second diode 1018 and the third diode 1019 are formed with a PNP bipolar junction transistor (BJT) respectively, in which a collector of the BJT is coupled to a base of the BJT. The reference circuit 101 of the present invention utilizes the divider 1016 to reduce the output changeable voltage VBG.

Figure 3:
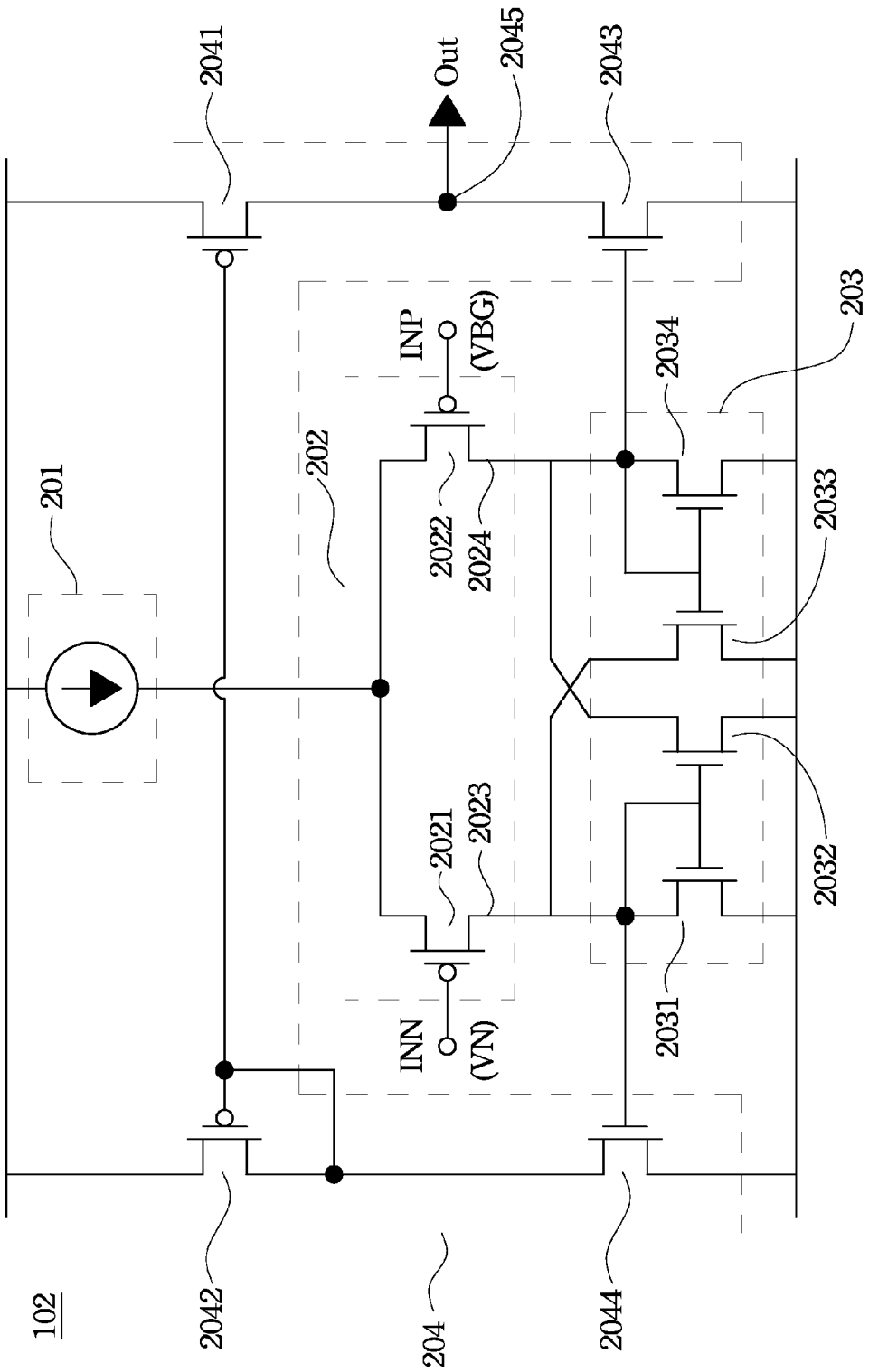
FIG. 3 is a schematic diagram of a hysteretic comparator according to the present invention.

FIG. 3 is a schematic diagram of the hysteretic comparator 102 according to the present invention. As shown in FIG. 3, the hysteretic comparator 102 is composed of a bias current unit 201, a switching unit 202, a current sink unit 203 and a signal output unit 204.

The bias unit 201 is connected to the switching unit 202 so as to maintain a constant current I. The switching unit 202 including a first current path 2023 and a second current path 2024 controlled by a first transistor 2021 and a second transistor 2022 respectively. A gate of the first transistor 2021 forms a first input (INN) of the hysteretic comparator 102 to receive the changeable voltage VN. A gate of the second transistor 2022 forms a second input (INP) of the hysteretic comparator 102 to receive the reference voltage VBG. Drains of the first transistor 2021 and the second transistor 2022 are connected to each other, and the connecting point thereof is connected to the bias unit 201. The first transistor 2021 and the second transistor 2022 arrange the constant current I in the first current path 2023 and the second current path 2024 according to the reference voltage VBG and the changeable voltage VN.

The current sink unit 203 is connected to the switching unit 202. The current sink unit 203 sinks the current into the first current path 2023 and the second current path 2024. The current sink unit 203 is composed of a third transistor 2031, a fourth transistor 2032, a fifth transistor 2033 and a sixth transistor 2034. The third transistor 2031 and the fourth transistor 2032 are connected in a current mirror relationship. A drain of the third transistor 2031 is connected to the first current path 2023. A drain of the fourth transistor 2032 is connected to the second current path 2024. A gate of the third transistor 2031 is connected to its drain as well as to a gate of the fourth transistor 2032, which together with the fourth transistor 2032 form a current mirror. A width/length ratio of the fourth transistor 2032 is greater than a width/length ratio of the third transistor 2031. The fifth transistor 2033 and the sixth transistor 2034 are connected in a current mirror relationship, too. A drain of the fifth transistor 2033 is connected to the first current path 2023. A drain of the sixth transistor 2034 is connected to the second current path 2024. A gate of the sixth transistor 2034 is connected to its drain as well as to a gate of the fifth transistor 2033, which together with the fifth transistor 2033 form a current mirror. A width/length ratio of the sixth transistor 2034 is larger than a width/length ratio of the fifth transistor 2033.

The signal output unit 204 is connected to the current sink unit 203 to output a power down signal. The signal output unit 204 is composed of a seventh transistor 2041, an eighth transistor 2042, a ninth transistor 2043 and a tenth transistor 2044. A gate of the eighth transistor 2042 is connected to its drain as well as to a gate of the seventh transistor 2041, which together with the seventh transistor 2041 form a current mirror. A drain of the ninth transistor 2043 is connected to a drain of the seventh transistor 2041, and a gate of the ninth transistor 2043 is connected to the second current path 2024. A drain of the tenth transistor 2044 is connected to a drain of the eighth transistor 2042, and a gate of the tenth transistor 2044 is connected to the first current path 2023. In an embodiment, the first transistor 2021, the second transistor 2022, the seventh transistor 2041 and the eighth transistor 2042 are P-Type metal-oxide-semiconductor field-effect transistors (MOS-FETs). The third transistor 2031, the fourth transistor 2032, the fifth transistor 2033, the sixth transistor 2034, the ninth transistor 2043 and the tenth transistor 2043 are N-type MOS-FETs.

When the voltage comparator with such a construction compares the reference voltage VBG with the changeable voltage VN so as to output a low-level signal or a high-level signal, the process will be described as follows.

First, if the changeable voltage VN in the first input (INN) is smaller than the reference voltage VBG in the second input (INP), a current conducted through the first current path 2023 is larger than that through the second current path 2024. The majority of the constant current I generated by the bias unit 201 then flows through the first transistor 2021, the first current path 2023, the third transistor 2031 and the fifth transistor 2033 to ground. It is noted that the current flowing through the fifth transistor 2033 is almost equal to the current flowing through the sixth transistor 2034 by mirror relationship. The current flowing through the second transistor 2022, the second current path 2024, the forth transistor 2032 and the sixth transistor 2034 to ground is almost no flow of current. It is noted that the current flowing through the second transistor 2022 flows into the forth transistor 2032 largely by mirror relationship with the third transistor 2031. The gate voltage at the current mirror of the sixth transistor 2034 and the fifth transistor 2033 is low-level. In this arrangement the output signal at the output point 2045 is a high level signal.

When the changeable voltage VN in the first input (INN) is greater than the reference voltage VBG in the second input (INP), the current flowing through the second transistor 2022, the second current path 2024, the fifth transistor 2033 and the sixth transistor 2034 to ground gradually increases, thus causing the comparator to be switched when the current flowing through the fourth transistor 2032 is corresponding to the current flowing through the sixth transistor 2034. Then the current flowing through the sixth transistor 2034 exceeds the current flowing through the fourth transistor 2032. For enabling this switching action, the gate capacitances of the fifth transistors 2033 and the sixth transistor 2034, which were previously at a low-level voltage, need to be charged to a high-level voltage by taking a certain period of time Dt. Then, the ninth transistor 2043 is turned on to output a low-level signal at the output point 2045.

Figure 4:
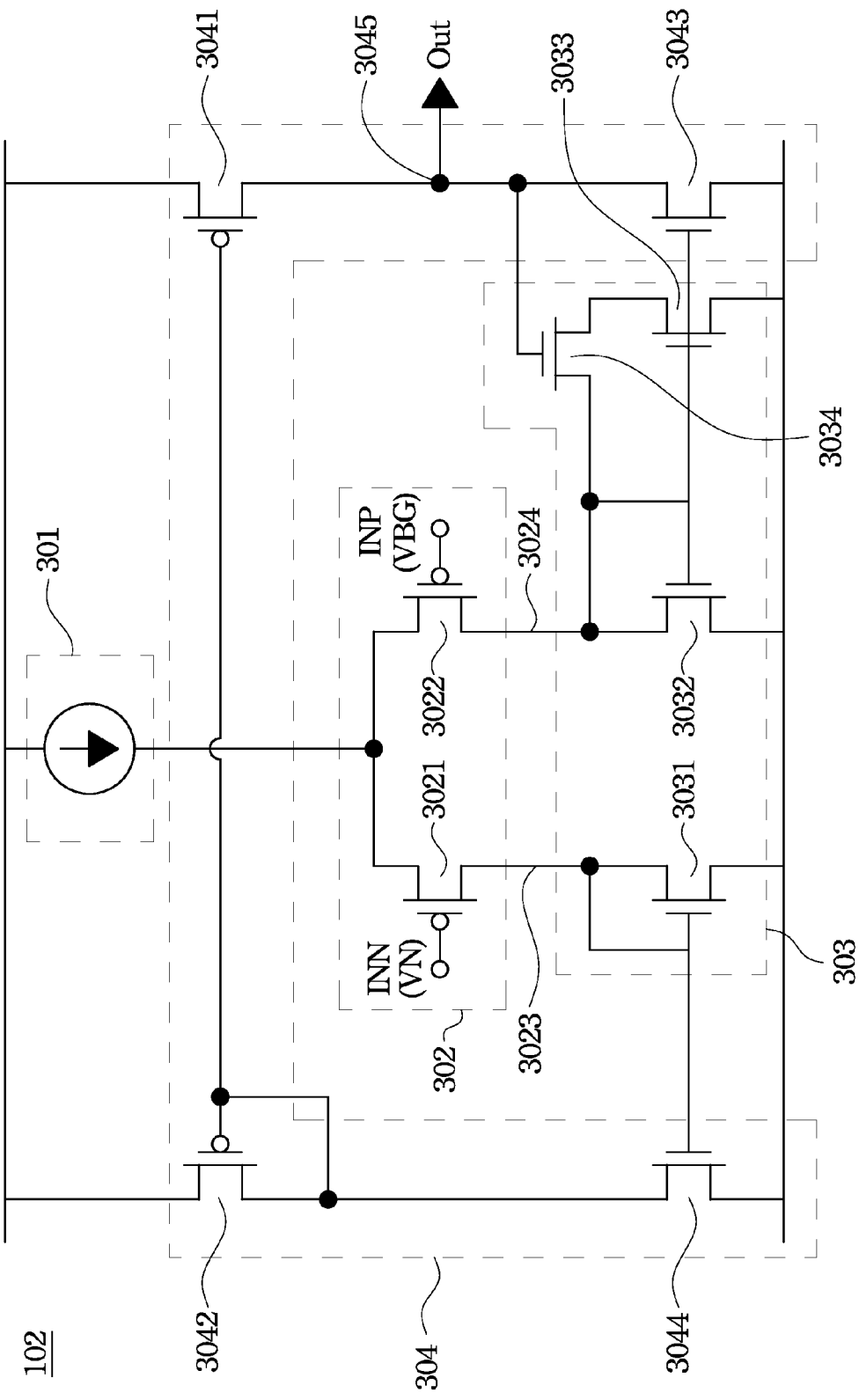
FIG. 4 is a schematic diagram of a hysteretic comparator according to another embodiment of the present invention.

FIG. 4 is a schematic diagram of the hysteretic comparator 102 according to another embodiment of the present invention. As shown in FIG. 4, the hysteretic comparator 102 is composed of a bias current unit 301, a switching unit 302, a current sink unit 303 and a signal output unit 304.

The bias unit 301 is connected to the switching unit 302 so as to maintain a constant amount of current I. The switching unit 302 including a first current path 3023 and a second current path 3024 controlled by the first transistor 3021 and the second transistor 3022 respectively. A gate of the first transistor 3021 forms the first input (INN) of the hysteretic comparator 102 to receive the changeable voltage VN. A gate of the second transistor 3022 forms the second input (INP) of the hysteretic comparator 102 to receive the reference voltage VBG. Drains of the first transistor 3021 and the second transistor 3022 are connected to each other, and the connecting point thereof is connected to bias unit 301. The first transistor 3021 and the second transistor 3022 arrange the constant current I in the first current path 3023 and the second current path 3024 according to the reference voltage VBG and the changeable voltage VN.

The current sink unit 303 is connected to the switching unit 302. The current sink unit 303 sinks the current into the first current path 3023 and the second current path 3024. The current sink unit 303 is composed of a third transistor 3031, a fourth transistor 3032, a fifth transistor 3033 and a sixth transistor 3034. A drain of the third transistor 3031 is connected to the first current path 2023. A drain of the fourth transistor 3032 is connected to the second current path 2024. A gate of the third transistor 3031 is connected to its drain as well as to the signal output unit 304. A gate of the fourth transistor 3032 is connected to its drain. A gate of the fifth transistor 3033 is connected to a gate of the fourth transistor 3032 and the signal output unit 304. The sixth transistor 3034 is connected between the gate of the fourth transistor 3032 and a drain of the fifth transistor 3033, and a gate of the sixth transistor 3034 is connected to the signal output unit 304.

The signal output unit 304 is connected to the current sink unit 303 to output a power down signal. The signal output unit 304 is composed of a seventh transistor 3041, an eighth transistor 3042, a ninth transistor 3043 and a tenth transistor 3044. A gate of the eighth transistor 3042 is connected to its drain as well as to the gate of the seventh transistor 3041, which together with the seventh transistor 3041 form a current mirror. A drain of the ninth transistor 3043 is connected to a drain of the seventh transistor 3041 and the gate of the sixth transistor 3034. A gate of the ninth transistor 3043 is connected to the gate of the fifth transistor 3033 and the gate of the fourth transistor 3032. A drain of the tenth transistor 3043 is connected to a drain of the eighth transistor 3042, and a gate of the tenth transistor 3044 is connected to the gate of the third transistor 3031. In an embodiment, the first transistor 3021, the second transistor 3022, the sixth transistor 3041 and the seventh transistor 3042 are P-Type MOS-FETs, and the third transistor 3031, the fourth transistor 3032, the fifth transistor 3033, the sixth transistor 3034, the eighth transistor 3043 and the ninth transistor 2043 are N-type MOS-FETs.

First, if the changeable voltage VN in the first input (INN) is smaller than the reference voltage VBG in the second input (INP), a current conducted through the first current path 3023 is larger than that through the second current path 3024. The majority of the constant current I generated by the bias unit 301 then flows through the first transistor 3021, the first current path 3023 and the third transistor 3031 to ground. The current flowing through the second transistor 3022, the second current path 3024 and the fourth transistor 3032 to ground is only a minor, or no flow of current. The gate voltage at the current mirror of the sixth transistor 2034 and the fifth transistor 2033 is low-level. In this arrangement, the output signal at the output point 3045 is a high level signal.

When the changeable voltage VN in the first input (INN) is greater than the reference voltage VBG in the second input (INP), the current flowing through the second transistor 3022, the second current path 3024 and the fourth transistor 3032 to ground gradually increases, thus causing the comparator to be switched when the current flowing through the second transistor 3022 and the fourth transistor 3032 is corresponding to the current flowing through the second transistor 3022 and the fifth transistor 3033. For enabling this switching action, the gate capacitance of the fifth transistors 3033 and the fourth transistor 3032, which were previously at a low-level voltage, needs to be charged to a high-level voltage by taking a certain period of time Dt. Then, the ninth transistor 3043 is turned on to output a low-level signal at the output point 3045.

Accordingly, a reference circuit and a hysteretic comparator are used in the present invention to form the over temperature protection circuit. Therefore, the whole volume of the over temperature protection circuit is reduced and the manufacturing cost is also reduced.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An over temperature protection circuit, comprising:
   a reference circuit for generating a reference voltage and a changeable voltage, wherein the changeable voltage is varied by temperature; and
   a hysteretic comparator for comparing the reference voltage and the changeable voltage to output a power down signal, wherein the hysteretic comparator further comprises:
      a bias current unit for generating a constant current;
      a switching unit connected to the bias current unit, wherein the switching unit including a first current path and a second current path, and the switching unit receives the reference voltage and the changeable voltage to arrange the constant current in the first current path and the second current path;
      a current sink unit connected to the switching unit, wherein the current sink unit sinks the current into the first current path and the second current path; and
      a signal output unit connected to the current sink unit to output the power down signal,
   wherein the reference circuit is a bandgap voltage reference circuit, further comprises:
   an operational amplifier;
   an eleventh transistor, a gate of the eleventh transistor being coupled to an output end of the first operational amplifier, a source of the eleventh transistor being coupled to a power supply, a drain of the eleventh transistor being coupled to a positive input end of the first operational amplifier;
   a twelfth transistor, a gate of the twelfth transistor being coupled to the output end of the first operational amplifier, a source of the twelfth transistor being coupled to the power supply, and a drain of the twelfth transistor being coupled to a negative input end of the first operational amplifier;
   a thirteenth transistor, a gate of the thirteenth transistor being coupled to the output end of the first operational amplifier, and a source of the thirteenth transistor being coupled to the power supply;
   a resistor, a first end of the first resistor being coupled to the positive input end of the first operational amplifier;
   a divider, a first end of the divider being coupled to a drain of the thirteenth transistor to generate the reference voltage;
   a first diode, a first end of the first diode being coupled to a second end of the resistor, and a second end of the first diode being coupled to a ground;
   a second diode, a first end of the second diode being coupled to the negative input end of the operational amplifier to generate the changeable voltage, a second end of the second diode being coupled to the ground; and
   a third diode, a first end of the third diode being coupled to the drain of the thirteenth transistor, a second end of the second diode being coupled to the ground.

2. The over temperature protection circuit of claim 1, wherein the switching unit further comprises:
   a first transistor for receiving the changeable voltage to control the current flowing in the first current path; and
   a second transistor for receiving the reference voltage to control the current flowing in the second current path.

3. The over temperature protection circuit of claim 2, wherein the current sink unit further comprises:
   a third transistor and a fourth transistor connected in a current mirror relationship, wherein the third transistor is connected to the first current path, and the fourth transistor is connected to the second current path; and
   a fifth transistor and a sixth transistor connected in a current mirror relationship, wherein the fifth transistor is connected to the first current path, and the sixth transistor is connected to the second current path.

4. The over temperature protection circuit of claim 3, wherein a width/length ratio of the fourth transistor is greater than a width/length ratio of the third transistor, and a width/length ratio of the sixth transistor is greater than a width/length ratio of the fifth transistor.

5. The over temperature protection circuit of claim 3, wherein the signal output unit further comprises:
   a seventh transistor;
   an eighth transistor connected with the seventh transistor in a current mirror relationship;
   a ninth transistor, wherein a drain of the ninth transistor is connected to the seventh transistor, and a gate of the ninth transistor is connected to the second current path; and
   a tenth transistor, wherein a drain of the tenth transistor is connected to the eighth transistor, and a gate of the tenth transistor is connected to the first current path.

6. The over temperature protection circuit of claim 3, wherein the first transistor, the second transistor, the seventh transistor and the eighth transistor are P-Type metal-oxide-semiconductor field-effect transistors (MOS-FETs), and the third transistor, the fourth transistor, the fifth transistor, the sixth transistor, the ninth transistor and the tenth transistor are N-type MOS-FETs.

7. The over temperature protection circuit of claim 2, wherein the current sink unit further comprises:
   a third transistor, wherein a gate of the third transistor is connected to a drain of the third transistor and the first current path;
   a fourth transistor, wherein a gate of the fourth transistor is connected to a drain of the fourth transistor and the second current path;
   a fifth transistor, wherein a gate of the fifth transistor is connected to a gate of the fourth transistor and the signal output unit; and
   a sixth transistor, wherein the sixth transistor is connected between the gate of the fourth transistor and a drain of the fifth transistor, and a gate of the sixth transistor is connected to the signal output unit.

8. The over temperature protection circuit of claim 7, wherein the signal output unit further comprises:
   a seventh transistor;
   an eighth transistor connected to the seventh transistor in a current mirror relationship;
   a ninth transistor, wherein a drain of the ninth transistor is connected to the seventh transistor and a gate of the sixth transistor, and a gate of the ninth transistor is connected to the gate of the fifth transistor and the gate of the fourth transistor; and
   a tenth transistor, wherein a drain of the tenth transistor is connected to the eighth transistor and a gate of the tenth transistor is connected to a gate of the third transistor.

9. The over temperature protection circuit of claim 8, wherein the first transistor, the second transistor, the seventh transistor and the eighth transistor are P-Type MOS-FETs, and the third transistor, the fourth transistor, the fifth transistor, the sixth transistor, the ninth transistor and the tenth transistor are N-type MOS-FETs.

10. The over temperature protection circuit of claim 1, wherein the eleventh transistor, the twelfth transistor, and the thirteenth transistor are P-type MOS FETs.

11. The over temperature protection circuit of claim 1, wherein the first diode, the second diode and the third diode are formed with a PNP bipolar junction transistor (BJT) respectively, a collector of the BJT being coupled to a base of the BJT.

\* \* \* \* \*